March 5, 1968  M. L. A. TISSOT-DUPONT  3,371,684
PNEUMATIC OR THE LIKE VALVE CONTROL ARRANGEMENT
Filed Sept. 8, 1964  2 Sheets-Sheet 1

MICHEL LOUIS ANDRÉ
TISSOT-DUPONT
INVENTOR.

BY  J. L. Kalling

March 5, 1968  M. L. A. TISSOT-DUPONT  3,371,684
PNEUMATIC OR THE LIKE VALVE CONTROL ARRANGEMENT
Filed Sept. 8, 1964  2 Sheets-Sheet 2

MICHEL LOUIS ANDRÉ
TISSOT-DUPONT
INVENTOR.

BY J. L. Kallin

United States Patent Office 3,371,684
Patented Mar. 5, 1968

3,371,684
PNEUMATIC OR THE LIKE VALVE
CONTROL ARRANGEMENT
Michel Louis André Tissot-Dupont, Annecy, France,
assignor to S. T. Dupont, Paris, France
Filed Sept. 8, 1964, Ser. No. 394,848
Claims priority, application France, Sept. 11, 1963,
947,243
3 Claims. (Cl. 137—609)

The present invention has for its object a control arrangement of pneumatic or the like valves, in particular valves guided by being connected to exhaust, presenting numerous advantages compared with arrangements of similar types known at the present time. Amongst these advantages can be cited especially; absence of joint on the surface carrying the core, whence better magnetic conduction for a similar diameter of core; application on the closing joints of efforts reduced compared with known arrangements, the closing being obtained by application of springs and not by more powerful magnetic action, thus avoiding wear and rapid deterioration of the said joints; reduction of wear of the joints etc.

The invention is applicable in particular to valves guided through being connected to exhaust, wherein the reversal of the piston displacements is obtained by opening the one, previously closed, of two exhaust orifices of a cylinder surrounding the said piston, the other orifice, open until then, closing simultaneously. According to one known construction the control of the opening and closing of the exhaust orifices of the pneumatic arrangement is obtained with the assistance of the core of an electromagnetic coil closing one or the other orifice and simultaneously opening the orifice opposed to that which is closed. The closing of one of the orifices is obtained by applying pressure with the aid of a spring to the core, which at one of its ends is provided with a joint, to urge the core against a channel of the said orifice, and the closing of the second orifice is obtained by applying a pressure by using electro-magnetic action, the coil being energized to the core provided at its other end with a second joint to urge the core against channel of the said second orifice.

According to the present invention the closing of the exhaust orifices is obtained with the aid of springs selected in such a way as to avoid all violent crushing of the joints compared with the magnetic closing of the known arrangements and for this reason reducing the risks of wear and of rapid deterioration of the said joints, or permitting the recovery of possible settling of these joints. On the other hand when the coil is energized the face of the core supported at the base of the coil, not requiring any joints, thus makes it possible to obtain a better magnetic conduction, particularly when using alternating current, in which the surface of the magnetic circuit must be highly finished and as large as possible.

According to one method of realisation in accordance with the invention the closing of the orifices is effected with the assistance of valves urged by springs to abut in the closed position against the joints with which the said orifices are provided, and by the core of an electromagnetic coil in the open position. The core is urged in one direction, corresponding to the opening of one of the orifices, by a spring, and in the other direction, corresponding to the opening of the other orifice, by the action of the energised coil.

According to one method of construction in accordance with the invention, wherein one coil and one core are provided for each orifice, the closure of the orifice is effected by the core, provided with a joint, of the electro-magnetic coil, urged by a spring, an opening being effected by energizing the said coil and thereby retracting the core.

The invention will be described further by way of example, with reference to the accompanying drawings, in which.

Figure 1:
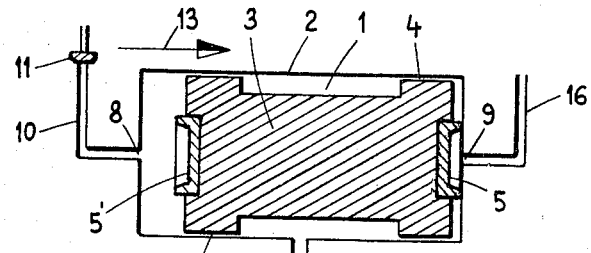
FIG. 1 is a diagrammatic view in longitudinal section of a pneumatic valve guided by being connected to exhaust.
Figure 2:
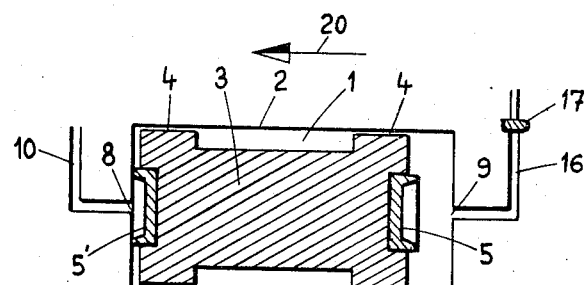
FIG. 2 is a diagrammatic view in longitudinal section of the pneumatic valve of FIG. 1 shown in a position where the piston is opposite to that of FIG. 1.

The pneumatic valve 1 shown in FIGS. 1 and 2 is constituted by a cylinder 2 in which there slides a piston 3 presenting two end bearings 4 sliding with play in the cylinder 2, each of the extremities of the piston 3 carrying a joint 5 and 5' for closing the exhaust orifices 8 and 9 of the valve 1. When the passage 10 corresponding to the exhaust orifice 8 is closed by the joint 11, fluid under pressure, introduced through the admission orifice 12 drives the piston 3 in the direction of arrow 13 until the orifice 9 has been closed by the joint 5 (FIG. 1).

When the passage 16 corresponding to the exhaust orifice 9 is closed by the joint 17 and the passage 10 of the orifice 8 is at the same time open, the fluid under pressure drives the piston 3 so as to slide in the direction of arrow 20 until the orifice 9 is closed by the joint 5' (FIG. 2).

Thus reversal of movement of the piston is obtained by simple simultaneous control, respectively of the opening and closing of the exhaust orifices of the valve.

Figure 3:
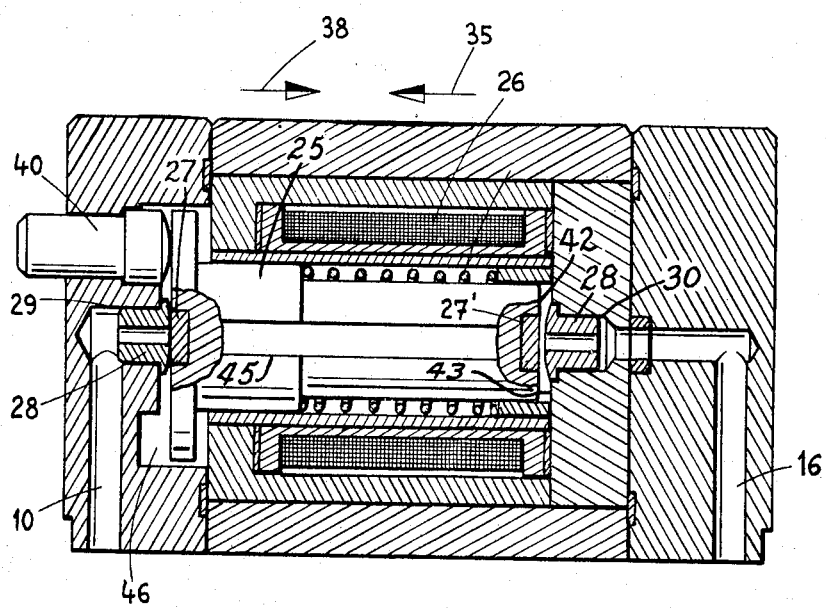
FIG. 3 is a view in longitudinal section of a valve or the like control arrangement of known type.

The arrangement shown in FIG. 3 of known type is designed for the control of valves such as 1 of FIGS. 1 and 2 or the like. In this arrangement a simultaneous control, respectively, of the opening and closing for example of the orifices 8 and 9 of the valve 1 of FIGS. 1 and 2, illustrated as the passages 10 and 16 in FIG. 3 is obtained with the assistance of a core 25 of an electro-magnetic coil 26. The core 25 carries at each of its ends a joint 27 and 27' abutting in the closed position, whether of the passage 10 or of the passage 16, against a suitable channel 28 formed in a gap 29 and 30 coinciding respectively with the passages 10 and 16. When the coil 26 is not energized, the core 25, urged by a spring 34, is driven in the direction of arrow 35, thus being caused to close one passage, for example 10, as shown in FIG. 3. The corresponding position of piston 3 of the valve 1 shown in FIGS. 1 and 2 is as shown in FIG. 1. The coil 26 being energized, the core 25 plunges in the direction of arrow 38 effecting the closing of the passage 16 and bringing about a reversal of movement of the piston 3 of the valve 1 of FIGS. 1 and 2, the said piston 3 then taking up the position shown in FIG. 2. It is likewise possible to induce this reversal of movement with the assistance of a push button 40 driving the core 25 in the direction of arrow 38, in the same manner as the magnetic action of the energized coil 26.

This arrangement nevertheless has some disadvantages. It can be mentioned, for example, that the face 42 of the core 25 does not come into contact with the base 43 of the magnetic coil 26 when the latter is energized and for this reason does not permit a maximum magnetic circuit to be obtained, particularly using alternating current unless the closing surface of the magnetic circuit is very highly finished and has a large an area as possible. On the other hand the joint ensuring the closing when the coil is energized (27' of FIG. 3) suffers relatively considerable crushing due to the action of the magnetic energy of the core, rapidly resulting in its being rendered unserviceable.

Thus, with the arrangement being realised in such a manner that in the depressed position of the core 25 the face of this later comes as soon as possible from the base 43 of the coil 26, the recovery from wear and the deterioration of the joint ensuring the closing when the said coil 26 is energized, is of a relatively small value and does not permit the arrangement ensuring functioning for a long time. When the coil 26 is deenergized as shown in FIG. 3, the passage 16 being open, the fluid only escapes in the space 46 including an exhaust hole towards the exterior (not shown) after passage across the coil along a suitable groove 45 of the core 25.

Figure 4:
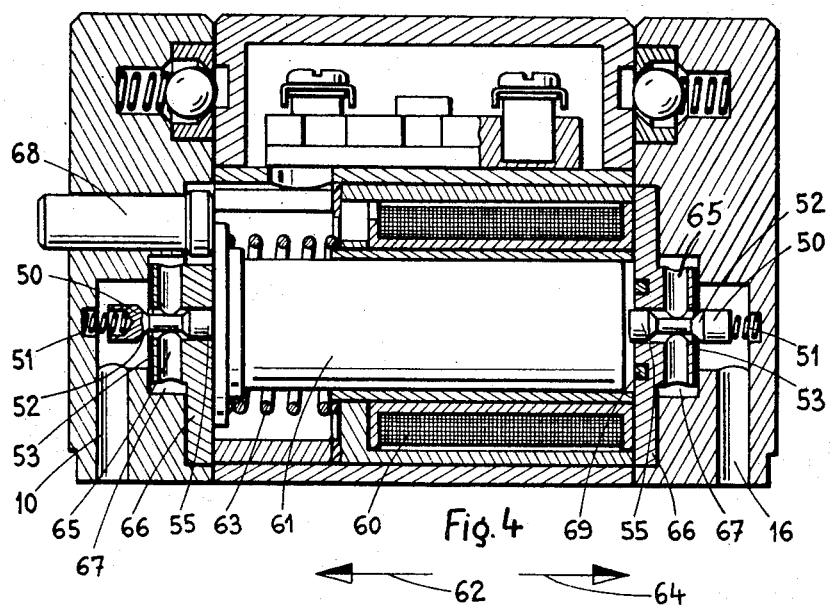
FIG. 4 is a view in longitudinal section of a pneumatic valve or the like control arrangement in accordance with one embodiment of the invention.

In the arrangement shown in FIG. 4 the closing of each of the passages 10 and 16 is obtained with the assistance respectively of a valve 50 urged by a spring 51 through the intermediary of a conical bearing with which it is moved into abutment against a flat seat 53. Each valve 50 includes a sliding guide spindle 55 permitting, amongst other things the control of the opening to be effected. The arrangement is provided with an electro-magnetic coil 60 in which slides a core 61 urged either in the direction of arrow 62 under action of a suitable spring 63 or in the direction of arrow 64 under the action of the coil when the latter is energized. The spindle 55 of each valve 50 projects in the closed position into the interior of the corresponding base of the coil 60, which enables the core 61 to push the valve 50 from the passage 10 or 16 according to whether the coil 60 is energized or deenergized as the case may be. The exhaust of the fluid is effected through a hole of the seat 53, from holes 65 of cheek 66 constituting the base of the coil, and through one hole (not shown) made between the space 67 and the exterior of the arrangement. The control obtained by movement of the core 61 when the coil 60 is energized may likewise be effected by pushing on the end of a push button 68. On the other hand a dephasing ring 69, of copper, disposed at the base of the coil in the cheek 66 insures an excellent seating, without vibration, of the core 61 against the base of the said coil when the later is energized.

Figure 5:
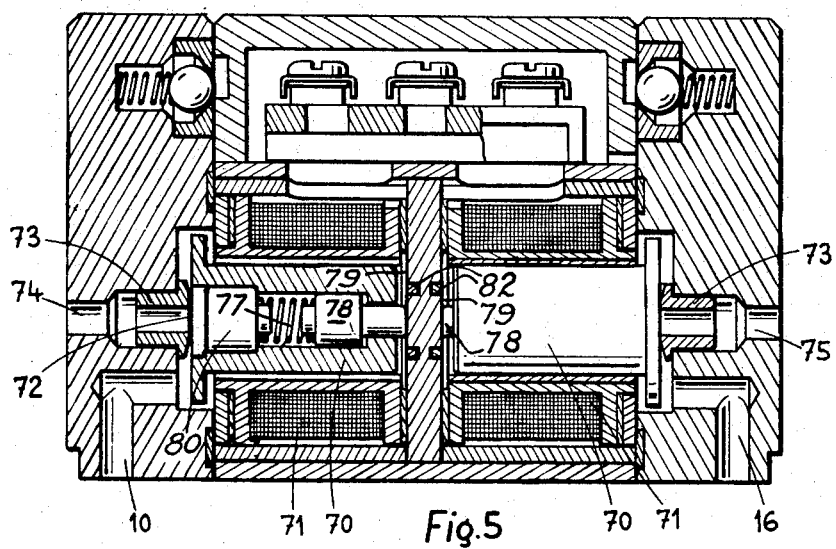
FIG. 5 is a view in longitudinal section of a pneumatic or the like valve control arrangement in accordance with a modified embodiment of the invention.

In the arrangement shown in FIG. 5 the closing of each of the passages 10 and 16 is obtained with the assistance of a core 70 of an electro-magnetic coil 71 provided with a seat 72 which ensures closure by bearing against a channel 73 formed in each exhaust passage 74 and 75, when the coil 71 is not energized. The core 70 is urged into abutment by the intermediary of the seat 72, against the channel 73, with the assistance of a spring 77 housed in the interior of the said core, spring 77 being provided between an intermediate piece 78 sliding freely in the interior of the core 70 and coming into abutment against the base 79 of the coil 71 and, a piece 80 also formed in the interior of the said core 70. The connecting to exhaust of each of the passages 10 and 16 is obtained by energization of its respective coil 71. On the other hand a dephasing ring 82 assuring an excellent positioning, without vibration, of each core 70 at the base of its respective coil 71 is situated in the said base of the latter.

It is to be noted that the arrangements in accordance with the invention illustrated in FIGS. 4 and 5 are contrary to known arrangements such as those shown in FIG. 3 in that the end face of each core when the coil is energized is caused to seal against the base of the said coil, thus assuring a maximum magnetic path; the closing of the passages being obtained under the action of the application of valves or cores urged in this direction by relatively weak springs and not by the direct action of the coil on the core; again when the one or other passage 10 or 16 is connected to exhaust the fluid does not traverse the valve or the like control arrangement.

It should also be noted in FIG. 4 that the pressure of the fluid arriving by the passages 10 and 16 tends to automatically close the valves 50, thus assuring an energetic closing proportional to the pressure of the fluid.

I claim:
1. A control valve comprising; a valve housing having an internal chamber with a pair of opposing end faces, a core mounted within said chamber for reciprocating movement between said end faces,
  spring means for biasing said core against one of said end faces,
  electro-magnetic means for counteracting the biasing of said spring means and for moving the core against the other of said end faces,
  passage means in each end of said housing having respective inlets and outlets,
  a bore in each end face interconnecting the chamber and respective passage means, a pair of valve means for controlling flow in said passage means, each of said valve means having an operating spindle projecting through one of said bores and into said chamber when the valve means are in the closed position,
  and biasing means for each said valve means biasing the valve means to the closed position; whereby the core when the electro-magnetic means is not energized will contact one of said valve spindles and open the corresponding valve means against the influence of its biasing means and when energized will contact the other of said valve spindles and open the corresponding valve means against the influence of its biasing means.

2. The control valve of claim 1 wherein said biasing means are springs.

3. The control valve of claim 1 further including a manual push-button projecting through an end of said housing and contacting said core in opposition to said spring means.

References Cited
UNITED STATES PATENTS

| | | | |
|---|---|---|---|
| 1,333,626 | 3/1920 | Moard | 251—139 |
| 2,485,232 | 10/1949 | Brown | 251—141 |
| 2,893,680 | 7/1959 | Freund | 251—30 |
| 2,935,086 | 5/1960 | Lehman | 251—30 |
| 3,232,312 | 2/1966 | Lansky | 251—141 |
| 2,616,449 | 11/1952 | Maha | 91—51 X |

FOREIGN PATENTS 1,332,566   6/1963   France.

M. CARY NELSON, *Primary Examiner.*

SAMUEL LEVINE, *Examiner.*

W. R. CLINE, P. T. CORBIN, *Assistant Examiers.*